June 24, 1930.  J. J. MONTEVALDO  1,766,224
WINDSHIELD WIPER
Filed June 2, 1926

INVENTOR.
JOHN J. MONTEVALDO.
BY
ATTORNEYS.

Patented June 24, 1930

1,766,224

UNITED STATES PATENT OFFICE

JOHN JOSEPH MONTEVALDO, OF SAN JOSE, CALIFORNIA

WINDSHIELD WIPER

Application filed June 2, 1926. Serial No. 113,165.

My invention relates to improvements in windshield wipers and it consists in the combinations, constructions and arrangements, hereinafter described and claimed.

An object of my invention is to provide a windshield wiper in which the squeegee is moved across the entire width of the windshield, thus providing a clear vision across the entire width of the windshield for the driver.

A further object of my invention is to provide a device of the type described in which novel means is provided for reversing the direction of the movement of the squeegee when the latter reaches its limit of travel, this reversing of the squeegee being accomplished while the driving element continually rotates in the same direction.

Other objects and advantages will appear in the following specification, and the novel features of the invention will be particularly pointed out in the appended claims.

My invention is illustrated in the accompanying drawing, forming a part of this application, in which—

Figure 1:
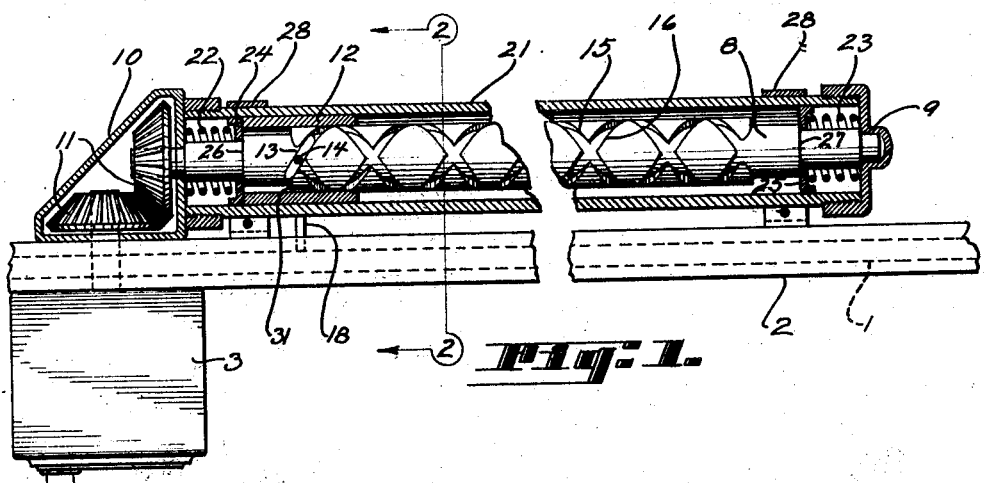
Figure 2:
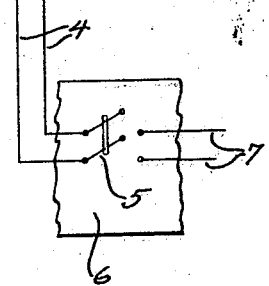
Figure 2:
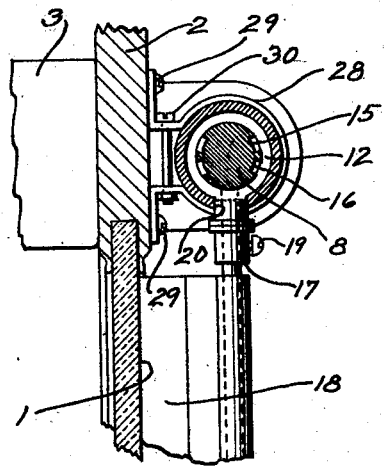

Figure 1 is a longitudinal section through the device showing the device applied to a windshield, and Figure 2 is a section along the line 2—2 of Figure 1.

In carrying out my invention I make use of a windshield glass 1 which is mounted within a frame 2.

To the inside of the frame 2 I secure an electric motor 3 of standard construction and connect this motor by suitable wirings 4 to a switch 5, preferably mounted on an instrument board 6. The switch 5 is adapted to connect the wires 4 to wires 7 which in turn are in electrical connection with a source of current not shown.

An oppositely threaded shaft 8 is journalled in a bearing 9 and in a casing 10. The casing 10 houses bevelled gears 11 which operatively connect the motor to the shaft.

A sleeve 12 is mounted upon the shaft 8 and carries a cam follower member 13, the latter being connected to the sleeve 12 at 14. The member 13 is adapted to be received in either the groove 15 or the groove 16 in the shaft 8.

In Figure 2 I show how the sleeve 12 carries a tubular member 17 in which the squeegee 18 is removably secured by means of a set screw 19.

The member 17 is slidably received in a slot 20, in the under side of a tubular casing 21 which houses the shaft 8.

Springs 22 and 23, see Figure 1, yieldingly hold stop members 24 and 25 against shoulders 26 and 27 in the shaft 8.

The purpose of this construction will be hereinafter described.

The means for securing the casing 21 to the frame 2 is shown in Figure 2. Clamping members 28 extend around the ends of the casing 21 and are secured by the screws 29 to the frame 2. The clamping members 28 are held in frictional engagement with the casing 21 by bolts 30.

From the foregoing description of the various parts of the device, the operation thereof may be readily understood. In Figure 1 I have shown the cam 13 as just clearing the end of the groove 16. Further rotation of the shaft 8 causes the cam 13 to ride free of the groove and causes the sleeve 12 to move the stop 24 away from the shoulder 26 and to compress the spring 22. The cam 13 is pivotally secured to the sleeve 12 and it will therefore swing into a position parallel with the shoulder 31 against which it abuts. As soon as the cam 13 comes into a position to be received by the groove 15, the pressure of the spring 22 upon the sleeve 12 will cause the cam member to move into the groove 15. The cam member 13 will now be moved along the groove 15 and will cause the sleeve 12 to move the squeegee across the front of the windshield.

In like manner when the cam 13 reaches the opposite end of the shaft 8, the spring 23 together with the stop member 25 will cause the cam member to be received in the groove 16. This movement is continued as long as shaft 8 continues to rotate. The device is extremely simple in construction and provides a simple and automatic means for moving a squeegee across the front of the windshield for cleaning the latter.

I claim:—

In a device of the character described, a casing, a shaft having reduced ends and oppositely threaded grooves thereon, the reduced ends of said shaft being rotatably supported on the casing, said grooves extending thru shoulders formed adjacent said reduced ends; a sleeve slidably mounted on the said shaft; a cam member pivotally carried by said sleeve and being slidable in said groooves; means for rotating said shaft, thereby causing said cam to ride free of one groove, thus allowing the cam to swing in a position parallel with the shoulder; a cup-shaped washer on each reduced end; a spring for pressing the washer against the adjacent shoulder of the shaft, said washer being slidable on the reduced end; said sleeve being adapted to force said washer away from said shoulder before the cam reaches the end of the groove, so as to allow the freeing of the cam from the groove; the action of said washer and spring forcing said cam in abutment with said shoulder so that the cam is forced to enter the groove of the opposite thread when said groove is rotated in alignment therewith, whereby said sleeve is reciprocated.

In testimony whereof I affix my signature.

JOHN JOSEPH MONTEVALDO.